(No Model.)

W. CRAIG.
AUTOMATIC THREE-WAY VALVE.

No. 509,118. Patented Nov. 21, 1893.

Witnesses:
C. J. Lundgren
George Barry.

Inventor:
William Craig
by attorneys
Brown & Seward

UNITED STATES PATENT OFFICE.

WILLIAM CRAIG, OF BROOKLYN, NEW YORK.

AUTOMATIC THREE-WAY VALVE.

SPECIFICATION forming part of Letters Patent No. 509,118, dated November 21, 1893.

Application filed March 25, 1893. Serial No. 467,571. (No model.)

*To all whom it may concern:*

Be it known that I, WILLIAM CRAIG, of Brooklyn, in the county of Kings and State of New York, have invented a new and useful Improvement in Automatic Three-Way Valves, of which the following is a specification.

My invention relates to an improvement in automatic three-way valves for condensing and non-condensing engines in which the valve stem is mounted in a casing and provided with valves located at intervals thereon for opening and closing communication between a common port intermediate of the two valves and the openings over which the valves carried by the common stem are arranged to close. In the form in which it is herein presented, the valve is particularly well adapted to be applied to the exhaust pipe of a condensing steam engine where it may serve to regulate the connection of the engine with the condenser at a moment's notice and automatically through loss of vacuum or other causes. It may also be applied to the exhaust pipe of non-condensing engines for heating buildings or any other purpose where exhaust steam is used, serving to regulate automatically any desired pressure that may be required and requiring no attention. In valves of this character where the valve stem is mounted in the hub of a bridge or spider stretched across the opening over which the valve is intended to seat, the space occupied by such bridge or spider has materially reduced the opening so that it has been necessary to make the diameter of the opening and the diameter of the valve for covering it materially greater than would be required in case the opening were not partially obstructed by the bridge or spider.

My present invention contemplates the removal of the obstructing bridge or spider from the opening surrounded by the valve seat and the consequent material reduction of the diameter of the opening and of the valve for covering it for any given area of free opening required.

My invention also contemplates the connection of the valve stem with the dog by which the valves are operated, in such a manner as to permit the valve stem and valves fixed thereon to rotate freely in their bearings at the same time that they remain under the control of the operating lever.

My invention further contemplates certain provision for the examination of the valve which also permits the operating spindle and its crank pin to be made in one piece.

Figure 2:
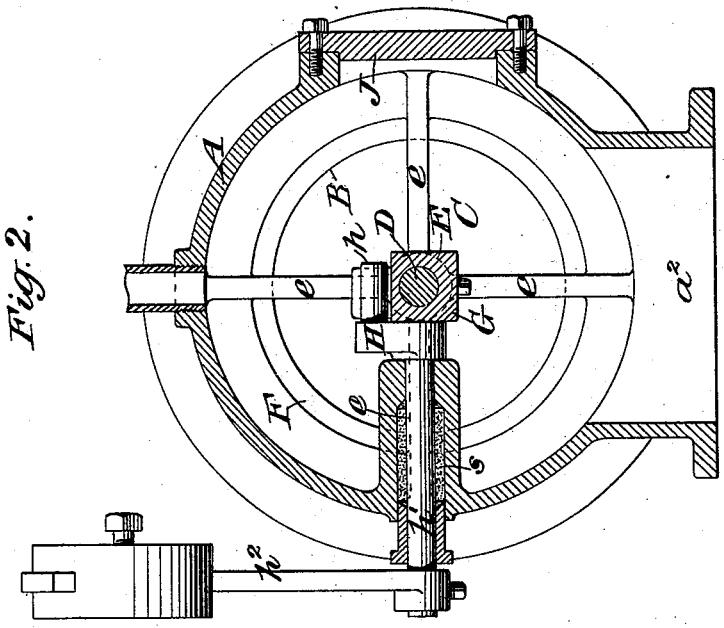
Figure 1:
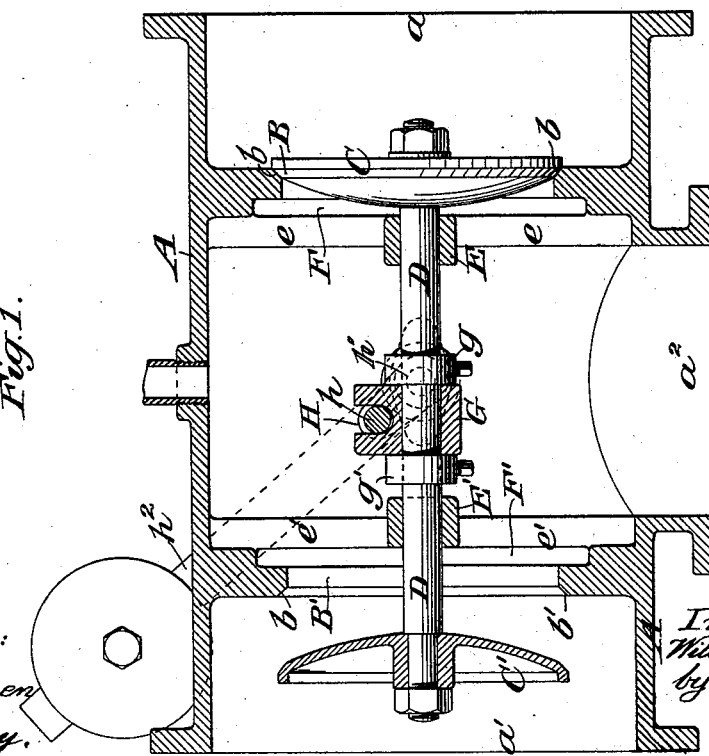

In the accompanying drawings, Figure 1 is a longitudinal section taken through the valve casing and showing the valves in operative position relative to their seats, one open and the other closed, and Fig. 2 is a transverse section through the casing and valve stem intermediate of the valves, showing in elevation the weighted lever for operating them.

The valve casing is denoted as a whole by A and is provided with openings $a$ and $a'$ at its opposite ends and an opening $a^2$ intermediate of its ends. The openings to be closed and opened by the valves are represented respectively by B and B', the former being surrounded by an annular valve seat $b$ and the latter by an annular valve seat $b'$. The valves for closing the openings B and B' are represented by C and C'. They are fixed upon the opposite ends of a spindle or stem D which is mounted so as to slide longitudinally and rotate within hubs E and E'. The hub E is provided with arms $e$ radiating therefrom and connecting with the interior of the casing A and the hub E' is in like manner provided with arms $e'$ radiating therefrom and connecting with the interior of the casing.

Instead of locating the hubs E and E' with their radiating arms (which form the bearing bridges or spiders for the valve stem) within the openings B and B' to be covered by the valves C and C', I locate them at a distance back or away from the openings, as indicated in the drawings, leaving intermediate free spaces F, F' between the bridges and the openings, over which the valves are seated, the free spaces F and F' being of sufficiently increased diameter to open a passageway to and through the bridges which shall equal in area the area of the free opening B or B'. By this simple device I am enabled to make the opening to be covered by the valve correspond to the area of the free opening required for the transmission of a given amount of fluid with the exception of a slight increase for the space occupied by the valve stem and I am at the same time enabled to materially reduce the size and weight of the valve to close such reduced opening.

It is desirable that valves of this character should seat in different rotary adjustments in order to render the wear more evenly distributed. To this end I mount the dog G loosely on the valve stem D between two adjustable collars $g$ and $g'$, the latter being fixed to the stem by any well known or suitable means as for example by set screws. The dog G is adapted to receive the pin $h$ of a crank H fixed to an operating spindle $h'$ carrying a weight operating lever $h^2$. This crank so fits between a portion of the inside of the casing and a flat side of the said dog as to keep the dog from turning and thereby preserve the proper relation between the crank and the dog.

The dog G by its engagement with the collars $g$ and $g'$ will cause the valve stem and hence the valves fixed thereon to move positively under the rocking movement of the lever $h^2$ while at the same time the said valve stem and valves are free to adjust themselves in any rotary adjustment that they may tend to assume.

The valve-operating spindle $h'$ works through a stuffing-box $s$ in one side of the casing A. In order to provide for making the said operating spindle $h'$ and its crank H in one piece and to provide for the insertion of the so constructed crank and spindle in their place from the inside of the casing, and to further provide for the examination of the valves and their seats at any time an opening is provided in the side of the casing opposite the stuffing-box and fitted with a removable bonnet J.

While I have shown the seating of the bearing bridge or spider back of the opening to be covered by the valve in connection with a three-way valve for exhaust pipes of condensing and non-condensing steam engines and while it is eminently practicable for such purposes, it is obvious that the same structure or its equivalent might be applied in connection with valves for other purposes and hence I do not wish to limit myself strictly to the construction and purpose herein set forth, but

What I claim as my invention is—

1. The combination with a casing, a valve seat therein and a valve mounted within the casing to move toward and away from the seat to close and open the opening surrounded by the seat, of a supporting device for the valve stem located in the path of the fluid passed through the said opening and spaced from the plane of the opening surrounded by the valve-seat, the intervening space between the said opening and the supporting device being of greater area in cross section than the said opening, to increase the free passage of the fluid past the supporting device, substantially as set forth.

2. The combination with the valve seat, the valve and a longitudinally sliding valve stem, of a valve operating device and a dog for connecting the valve operating device with the valve stem, the said dog being loosely mounted on the valve stem and locked against longitudinal movement thereon, substantially as herein set forth.

3. The combination with the valve casing, the valve stem, the dog on the said stem and the crank and its operating spindle made in one piece, of the stuffing-box provided in one side of the casing for said spindle and the removable bonnet on the opposite side of the casing, substantially as and for the purpose herein set forth.

WILLIAM CRAIG.

Witnesses:
FREDK. HAYNES,
GEORGE BARRY.